United States Patent [19]  
Tunoda

[11] Patent Number: 4,512,531  
[45] Date of Patent: Apr. 23, 1985

[54] FISHING REEL WITH TRAVERSE-CAM MEMBER ROTATABLY MOUNTED ON ANTI-REVERSE SHAFT

[75] Inventor: Kikuo Tunoda, Fuchu, Japan

[73] Assignee: Ryobi Limited, Hiroshima, Japan

[21] Appl. No.: 544,449

[22] Filed: Oct. 21, 1983

[30] Foreign Application Priority Data

Oct. 25, 1982 [JP] Japan ............................. 57-162180[U]

[51] Int. Cl.³ .............................................. A01K 89/02
[52] U.S. Cl. .......................................... 242/84.21 R
[58] Field of Search ....................... 242/84.21 R, 84.4; 74/22 R

[56] References Cited

U.S. PATENT DOCUMENTS 2,314,616 3/1943 Gaire ............................ 242/84.21 R
3,967,791 7/1976 Morishita ...................... 242/84.21 R
4,163,528 8/1979 Egasaki et al. ............... 242/84.21 R
4,416,428 11/1983 Noda ............................. 242/84.21 R

FOREIGN PATENT DOCUMENTS 617477 4/1961 Canada .......................... 242/84.21 R
56-141080 10/1981 Japan .

Primary Examiner—Stuart S. Levy
Assistant Examiner—Katherine Jaekel
Attorney, Agent, or Firm—Frishauf, Holtz, Goodman and Woodward

[57] ABSTRACT

In a fishing spinning reel, a traverse-cam cylinder is relatively rotatably mounted on an anti-reverse shaft which is arranged inside a reel body in parallel with a spool shaft. An oscillator secured to the spool shaft engages the traverse-cam cylinder so as to reciprocate the spool shaft upon rotation of the traverse-cam cylinder. The traverse-cam cylinder is rotated by one of dual face gears formed on a master gear while the other one of dual face gears rotates a rotor shaft.

10 Claims, 5 Drawing Figures

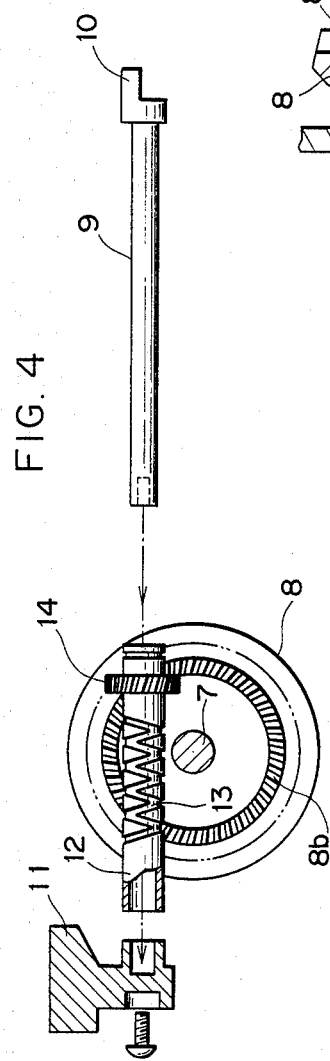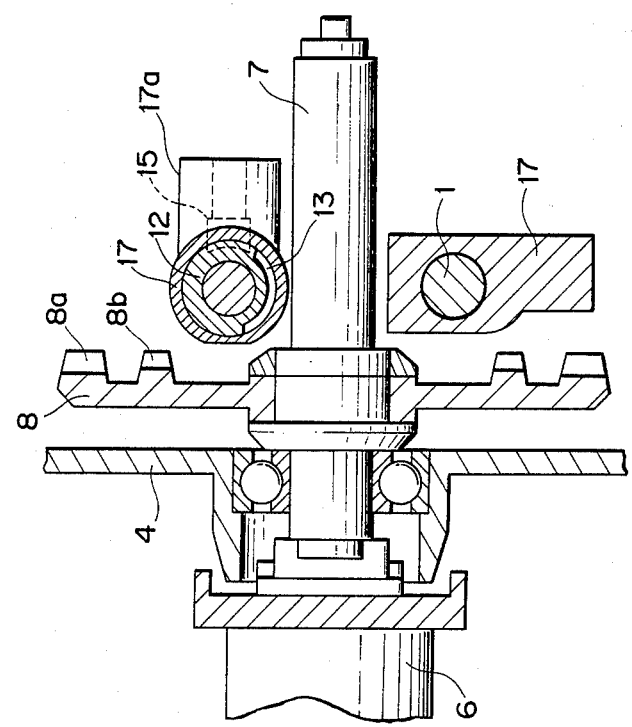
FIG. 4
FIG. 3

FISHING REEL WITH TRAVERSE-CAM MEMBER ROTATABLY MOUNTED ON ANTI-REVERSE SHAFT

BACKGROUND OF THE INVENTION

This invention relates to a fishing spinning reel, and more particularly, the spool reciprocating mechanisms thereof.

In the prior art, a mechanism has been proposed in Japanese utility Model Application Laid-open No. 141080/1981 wherein a spool shaft is reciprocated upon the rotation of a traverse-cam shaft laterally arranged inside a reel body. An oscillator-plate is vertically arranged at the rear end of the spool shaft and a contact member mounted at the lower portion of the oscillator-plate engages the grooves of the traverse-cam shaft to be relatively reciprocated upon the rotation of the traverse-cam shaft. The traverse-cam shaft is provided with a small gear at the front end thereof to engage a pinion secured to a rotor shaft and rotated by a master gear.

With the above constructed mechanism, however, additional space for the arrangement of the traverse-cam shaft is required, which enlarges the reel body. Further, as the rear end of the traverse-cam shaft must be supported by the rear portion of the reel body, it becomes difficult to arrange a drag mechanism at the rear portion for applying a drag force on the spool shaft. Moreover, it is difficult to obtain the desirable reciprocating speed of the spool, since the enlargement of the radius of the small gear of the traverse-cam shaft relative to the pinion of the rotor shaft is limited due to the requirement to decrease the width of the reel body and the inclination angle of the grooves on the traverse-cam shaft is also limited in order to prevent the damage of the contact member mounted on the oscillator plate to be engaged therewith.

SUMMARY OF THE INVENTION

Accordingly, it is an object of the invention to provide a fishing spinning reel equipped with a spool reciprocating mechanism wherein a traverse-cam member is arranged without enlarging a reel body and a drag mechanism can be arranged at the rear portion of the reel body.

Another object of the invention is to provide a fishing spinning reel capable of desirably setting the reciprocating speed of the spool independently of the rotary speed of the rotor.

According to this invention, there is provided a fishing spinning reel wherein a spool shaft is reciprocated by an oscillator secured to the spool shaft at one end thereof and engaged at the other end thereof with a traverse-cam member which is rotated upon the rotation of a master gear, characterized in that said traverse-cam member is formed as a cylinder and is relatively rotatably mounted on an anti-reverse shaft arranged inside a reel body in parallel with the spool shaft, and that said master gear is provided with dual face gears, one of which rotates a rotor while the other one rotates the traverse-cam member.

BRIEF DESCRIPTION OF THE DRAWINGS

FIG. 3 is an enlarged sectional view cut along the line III—III in FIG. 1;

FIG. 4 is an explanatory elevational view showing the relationship among an anti-reverse shaft, a traverse-cam shaft and a master gear.

DESCRIPTION OF THE PREFERRED EMBODIMENTS

Figure 1:
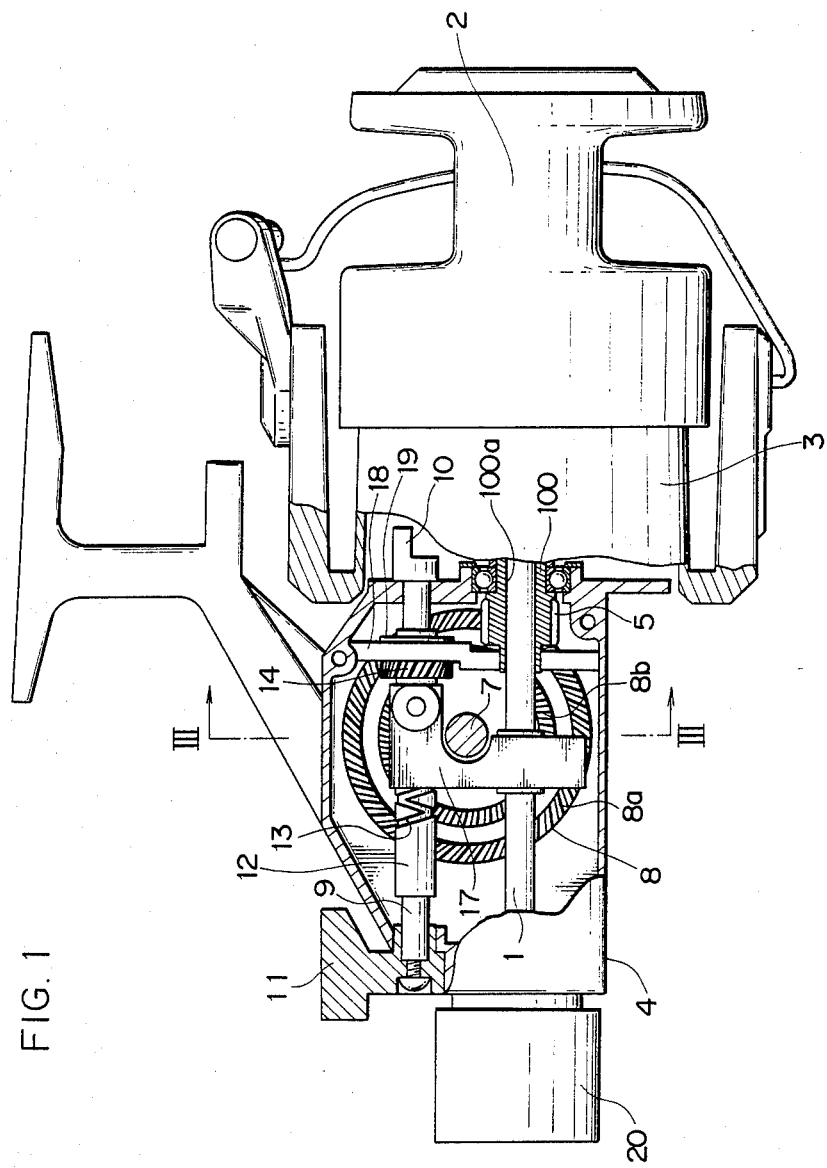
FIG. 1 is an elevational view partly in section of the fishing spinning reel embodying the invention.
Figure 2:
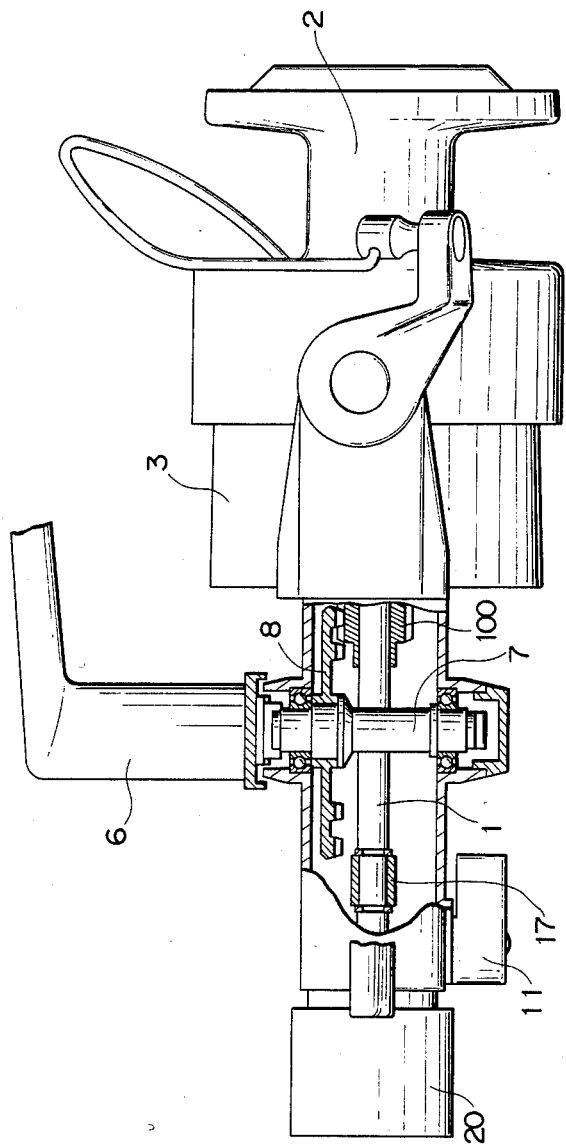
FIG. 2 is a plan view partly in section of the fishing spinning reel as shown in FIG. 1.

In the fishing spinning reel as illustrated in FIGS. 1 and 2, a spool shaft 1 and an anti-reverse shaft 9 are laterally arranged in a reel body 4 in such a manner as being horizontally parallel and opposed about a handle shaft 7. A handle 6 is secured on the handle shaft 7 exchangeably between the right and left sides thereof. On one side of the handle shaft 7, a master gear 8 is secured.

The spool shaft 1 extends through the inner hole 100a of a rotor shaft 100 connected to a rotor 3 and is secured to a spool 2 at the front end thereof. On the other hand, the rear end of the spool shaft is connected to a drag mechanism, not shown, arranged in a drag control knob 20.

The front end of the anti-reverse shaft 9 is connected to a reverse-rotation preventing pawl 10, while the rear end thereof is secured to a lever 11. On the anti-reverse shaft 9, as more clearly shown in FIG. 4 a traverse-cam cylinder 12 is rotatably mounted. The front end of the cylinder 12 is received by an intermediate supporting plate 18 (FIG. 1) vertically extending inside the reel body 4 and the axial movement thereof is prevented by a traverse-cam gear 14 formed on the outer-periphery of the cylinder 12 and a stop ring 19. On the central portion of the outer-periphery of the cylinder 12, a traverse-cam groove 13 is formed.

Figure 5:
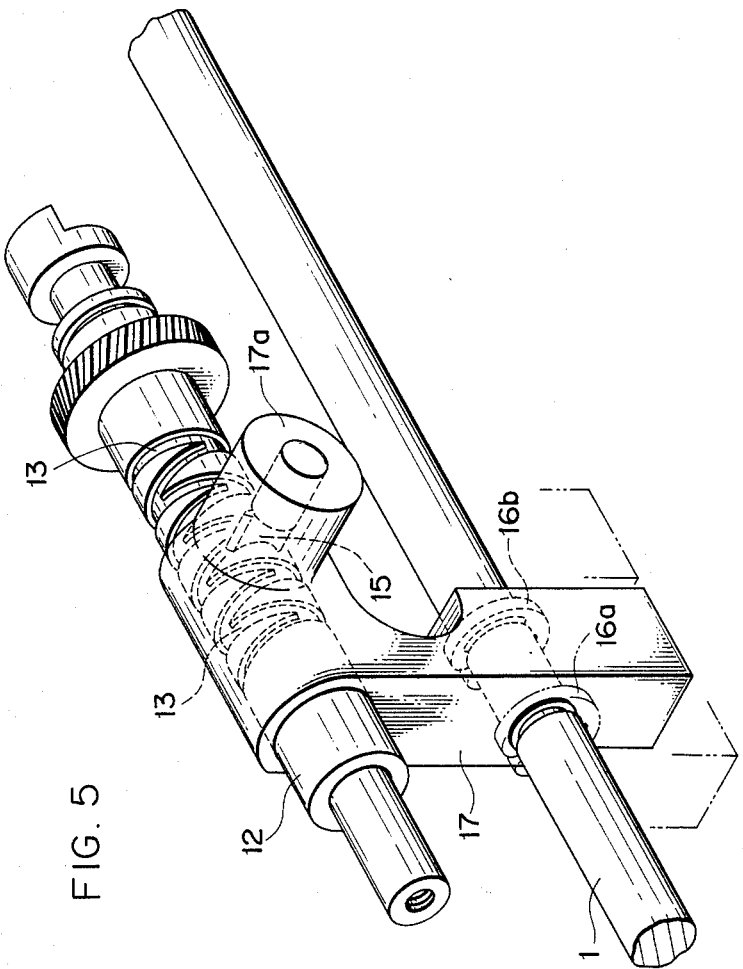
FIG. 5 is an explanatory perspective view showing the relationship among a traverse-cam shaft, an oscillator plate and a spool shaft.

An oscillator 17 (see FIG. 2) is vertically arranged to connect the traverse-cam cylinder 12 and the spool shaft 1. As shown in FIGS. 3 and 5, the lower portion of the oscillator 17 is mounted on the spool shaft 1 and the relative axial movement thereof is prevented by a pair of stop rings 16a and 16b secured to the spool shaft 1. The upper portion of the oscillator 17 is slidably mounted on the cylinder 12 and a contact member 15 arranged inside a side protruding housing 17a engages the traverse-cam groove 13.

The master gear 8 is mounted on the handle shaft 7 and is provided with first and second face gear portions 8a and 8b. The outer face gear 8a is arranged to engage a pinion 5 formed on the outer-periphery of the rotor shaft 100 while the inner face gear 8b is arranged to engage the traverse-cam gear 14.

With the construction as above described, when the handle 6 is rotated, the master gear 8 transmits the rotary force onto the rotary shaft 100 through the engagement of the outer face gear 8a and the pinion 5, thereby rotating the rotor 3. On the other hand, the master gear 8 transmits the rotary force onto the traverse-cam cylinder 12 independently through the engagement of the inner face gear portion 8b and the traverse-cam gear 14, thereby rotating the traverse-cam cylinder 12. Upon the rotation of the traverse-cam cylinder 12, the contact member 15 of the oscillator 17 relatively runs along the groove 13 of the cylinder 12 which creates the relatively reciprocative movement of the oscillator 17. As the oscillator 17 is unslidably secured to the spool shaft 1, the spool 2 is then reciprocated.

According to the invention as above described, as the rotary force of the handle 6 is transmitted onto the spool shaft 1 independently of that onto the rotor shaft 100, the desirable reciprocating speed can be set regardless of the rotary speed of the rotor 3. Further, as the traverse-cam cylinder 12 is mounted on the anti-reverse shaft 9, additional space for independently arranging a traverse-cam member becomes unnecessary, which makes the reel body 4 compact. Moreover, it is unnecessary to arrange a support for the tail of an independent traverse-cam member at the rear portion of the reel body 4, the drag mechanism can be freely situated there.

What is claimed is:

1. A fishing reel comprising:
    a housing; a rotor
    a spool shaft mounted in the housing;
    a traverse cam member mounted in the housing;
    oscillator means for reciprocating the spool shaft, said oscillator means having one end portion thereof secured to said spool shaft and another end portion thereof engaged with said traverse-cam member;
    a master gear coupled to said traverse-cam member for rotating said traverse-cam member;
    anti-reverse means including an anti-reverse shaft arranged inside said housing in parallel with said spool shaft;
    said traverse-cam member being formed as a cylinder and being mounted on said anti-reverse shaft so as to be rotatable relative to said anti-reverse shaft; and
    said master gear being provided with outer and inner face gears, one of which rotates said rotor of the fishing reel and the other of which is coupled to rotate said traverse-cam member.

2. The fishing reel according to claim 1 wherein said traverse-cam member comprises a cylinder having an outer periphery on which is provided a traverse-cam gear, and said other one of said face gears is engaged with said traverse-cam gear.

3. The fishing reel according to claim 2, wherein said cylinder is substantially fixedly mounted in the longitudinal direction thereof, and which is rotatable relative to said anti-reverse shaft.

4. The fishing reel according to claim 2, wherein said master gear inner and outer face gears are circular and concentrically arranged.

5. The fishing reel according to claim 4, wherein said inner face gear engages said traverse-cam gear, and said outer face gear is coupled to rotate said rotor of the fishing reel.

6. The fishing reel according to claim 2, wherein said oscillator means includes means engageable with said traverse-cam gear on the periphery of said cylinder such that said oscillator means reciprocates responsive to rotation of said traverse-cam member, thereby reciprocating said spool shaft to which said oscillator means is secured.

7. The fishing reel according to claim 6, wherein said oscillator means comprises an L-shaped member, one leg of said L-shaped member being engaged with said traverse-cam member.

8. The fishing reel according to claim 1 further comprising a rotor shaft on which said rotor is mounted, and a pinion on said rotor shaft; and
    wherein said one of said face gears in engaged with said pinion.

9. The fishing reel according to claim 1, wherein said master gear inner and outer face gears are circular and concentrically arranged.

10. The fishing reel according to claim 1, comprising a handle shaft extending through said reel body substantially perpendicularly to said spool shaft and said anti-reverse shaft, said spool shaft and said anti-reverse shaft being symmetrically arranged about said handle shaft.

* * * * *